(12) United States Patent
Wang et al.

(10) Patent No.: US 12,345,147 B2
(45) Date of Patent: Jul. 1, 2025

(54) MULTI-STAGE TEMPORARY PLUGGING FRACTURING METHOD BASED ON STRESS CAGE EFFECT, DEVICE THEREOF AND STORAGE MEDIUM

(71) Applicant: Beijing Institute of Petrochemical Technology, Beijing (CN)

(72) Inventors: Daobing Wang, Beijing (CN); Bo Yu, Beijing (CN); Mao Sheng, Beijing (CN); Zhiheng Tao, Beijing (CN); Shuiqing Hu, Beijing (CN); Yiqun Yan, Beijing (CN); Ziyi Xu, Beijing (CN); Dongliang Sun, Beijing (CN); Yang Shi, Beijing (CN); Xiuling Han, Beijing (CN)

(73) Assignee: Beijing Institute of Petrochemical Technology, Beijing (CN)

( * ) Notice: Subject to any disclaimer, the term of this patent is extended or adjusted under 35 U.S.C. 154(b) by 0 days.

(21) Appl. No.: 18/666,942

(22) Filed: May 17, 2024

(65) Prior Publication Data

US 2025/0012179 A1    Jan. 9, 2025

(30) Foreign Application Priority Data

Jul. 5, 2023    (CN) .......................... 202310816637.7

(51) Int. Cl.
  *E21B 43/26*    (2006.01)

(52) U.S. Cl.
  CPC .................................. *E21B 43/261* (2013.01)

(58) Field of Classification Search
  CPC ....................................................... E21B 43/26
  See application file for complete search history.

(56) References Cited

U.S. PATENT DOCUMENTS

2018/0149008 A1\*    5/2018    Nguyen ................. C09K 8/685
2020/0256176 A1\*    8/2020    Nguyen .................. C09K 8/62

\* cited by examiner

Primary Examiner — William D Hutton, Jr.
Assistant Examiner — Avi T Skaist
(74) Attorney, Agent, or Firm — Bay State IP, LLC (57) ABSTRACT

The present disclosure relates to a multi-stage temporary plugging fracturing method based on a stress cage effect, a device thereof and a storage medium, which are applied to the technical field of oil and gas exploitation. The method includes: determining a plugging point by acquiring a weak stress position on a major fracture; determining the consumption of temporary plugging deflection fluid by calculating a net pressure in a fracture that needs to be increased to generate a branch deflection fracture at the position where a principal stress is minimum; plugging a weakest stress position in the major fracture to form an artificial shielding layer, preventing subsequent fluid pressure from passing forward, thereby changing a geostress field near this position, thus forming an additional induced stress field near the weak position, generating a stress cage effect, and realizing formation of a multi-stage temporary plugging branch fracture in vertical wells.

8 Claims, 3 Drawing Sheets

```
┌─────────────────────────────────────────────────────────────────┐
│ Injecting a preset amount of acid liquid into a wellbore at a preset injection │─S1
│ speed to a stratum, so as to reduce a rock fracture pressure around the wellbore │
└─────────────────────────────────────────────────────────────────┘
                                  ↓
┌─────────────────────────────────────────────────────────────────┐
│ Injecting a preset amount of fracturing fluid into the wellbore at a preset │
│ injection speed to the stratum, and forming a first major fracture with an │─S2
│ injection point in the stratum as a starting point │
└─────────────────────────────────────────────────────────────────┘
                                  ↓
┌─────────────────────────────────────────────────────────────────┐
│ Acquiring a position where a principal stress of the first major fracture is │
│ minimum, in which the magnitude of the principal stress at the position is │─S3
│ denoted as σ_min │
└─────────────────────────────────────────────────────────────────┘
                                  ↓
┌─────────────────────────────────────────────────────────────────┐
│ According to the minimum principal stress σ_min, acquiring an increase value Δp │
│ of a net pressure in a fracture needed to generate a branch deflection fracture at │─S4
│ the position where the principal stress is minimum │
└─────────────────────────────────────────────────────────────────┘
                                  ↓
┌─────────────────────────────────────────────────────────────────┐
│ According to the increase value Δp of the net pressure in the fracture, acquiring │
│ a volume of temporary plugging deflection fluid needed to generate the branch │─S5
│ deflection fracture at the position where the principal stress is minimum │
└─────────────────────────────────────────────────────────────────┘
                                  ↓
┌─────────────────────────────────────────────────────────────────┐
│ Injecting the acquired volume of temporary plugging deflection fluid into the │
│ first major fracture, and plugging the position where the principal stress of the │─S6
│ first major fracture is minimum │
└─────────────────────────────────────────────────────────────────┘
                                  ↓
┌─────────────────────────────────────────────────────────────────┐
│ Injecting fracturing fluid into the first major fracture at a preset first injection │
│ speed until a deflection branch fracture is generated at the position where the │─S7
│ principal stress of the first major fracture is minimum │
└─────────────────────────────────────────────────────────────────┘
                                  ↓
┌─────────────────────────────────────────────────────────────────┐
│ Repeating Steps S2 to S6 to form a plurality of deflection branch fractures in │
│ the first major fracture until the distance between the position where the │
│ principal stress of the first major fracture is minimum and the position of the │─S8
│ injection point is less than a preset distance threshold, and completing │
│ multistage temporary plugging deflection fracturing of the first major fracture │
└─────────────────────────────────────────────────────────────────┘
```

MULTI-STAGE TEMPORARY PLUGGING FRACTURING METHOD BASED ON STRESS CAGE EFFECT, DEVICE THEREOF AND STORAGE MEDIUM

CROSS REFERENCE TO RELATED APPLICATION

This application claims the benefit of and takes priority from Chinese Patent Application No. 202310816637.7 filed on Jul. 5, 2023, the contents of which are herein incorporated by reference.

TECHNICAL FIELD

The present disclosure relates to the technical field of oil and gas engineering exploitation, in particular to a multi-stage temporary plugging fracturing method based on a stress cage effect, a device thereof and a storage medium.

BACKGROUND

Tight oil refers to oil accumulation that is sandwiched in or close to a tight reservoir of high-quality oil-generative assemblage without large-scale long-distance migration, which is an unconventional oil resource with the characteristics of low porosity and low permeability of a reservoir. Because of the undeveloped natural fractures in tight oil, it is difficult to form a complex fracture network. In the prior art, a large-scale and large-volume stratum fracture network reconstruction method is usually used, and the reconstruction volume is increased by increasing the intensity of using sand-carrying fluid and fracturing fluid during the formation of the fracture network, but such method leads to the deterioration of reservoir physical properties in a tight oil experimental block year by year and the non-ideal formation effect of the stratum fracture network with a high cost.

SUMMARY

In view of this, the purpose of the present disclosure is to provide a multi-stage temporary plugging fracturing method based on a stress cage effect, a device thereof and a storage medium, so as to solve the problem in the prior art that the reconstruction volume is increased by increasing the consumption of sand-carrying fluid and fracturing fluid during the formation of the fracture network, which leads to the deterioration of reservoir physical properties in a tight oil experimental block year by year and the non-ideal formation effect of the stratum fracture network with a high cost.

According to a first aspect of the embodiment of the present disclosure, there is provided a multi-stage temporary plugging fracturing method based on a stress cage effect, including:
   injecting a preset amount of acid liquid into a wellbore at a preset injection speed to a stratum, so as to reduce a rock fracture pressure around the wellbore;
   injecting a preset amount of fracturing fluid into the wellbore at a preset injection speed to the stratum, and forming a first major fracture with an injection point in the stratum as a starting point;
   acquiring a position where a principal stress of the first major fracture is minimum, in which the magnitude of the principal stress at the position is denoted as $\sigma_{min}$; according to the minimum principal stress $\sigma_{min}$, acquiring an increase value $\Delta p$ of a net pressure in a fracture needed to generate a branch deflection fracture at the position where the principal stress is minimum;
   according to the increase value $\Delta p$ of the net pressure in the fracture, acquiring a volume of temporary plugging deflection fluid needed to generate the branch deflection fracture at the position where the principal stress is minimum;
   injecting the acquired volume of temporary plugging deflection fluid into the first major fracture, and plugging the position where the principal stress of the first major fracture is minimum;
   injecting fracturing fluid into the first major fracture at a preset first injection speed until a deflection branch fracture is generated at the position where the principal stress of the first major fracture is minimum;
   repeating the above steps to form a plurality of deflection branch fractures in the first major fracture until the distance between the position where the principal stress of the first major fracture is minimum and the position of the injection point is less than a preset distance threshold, and completing multistage temporary plugging deflection fracturing of the first major fracture.
Preferably, the method further includes:
after completing multistage temporary plugging deflection fracturing of the first major fracture, injecting temporary plugging deflection fluid between the position where the principal stress of the first major fracture is minimum and the position of the injection point;
injecting the preset amount of fracturing fluid into the injection point at the preset injection speed, so that a second major fracture with a different direction from the first major fracture is generated with the injection point as the starting point;
thereafter, completing multistage temporary plugging deflection fracturing of the second major fracture according to the above steps;
generating a plurality of major fractures and completing multi-stage temporary plugging deflection fracturing of a plurality of major fractures until an angle between two adjacent major fractures is less than a preset angle threshold.
Preferably, the method further includes:
after completing multistage temporary plugging of the first major fracture or a plurality of major fractures, injecting sand-carrying fluid into the stratum through the wellbore to support the formed multistage temporary plugging branch fracture;
thereafter, injecting displacement fluid with a wellbore volume into the stratum through the wellbore, and displacing the sand-carrying fluid in the wellbore into the stratum.
Preferably,
acquiring a position where a principal stress of the first major fracture is minimum includes:
acquiring a shear stress, an x-direction normal stress and a y-direction normal stress at different positions in the first major fracture, acquiring principal stresses at different positions through the shear stress, the x-direction normal stress and the y-direction normal stress at different positions, and comparing the principal stresses at different positions to acquire the position where the principal stress is minimum.
Preferably,
according to the minimum principal stress $\sigma_{min}$, acquiring an increase value $\Delta p$ of a net pressure in a fracture needed to generate a branch deflection fracture at the position where the principal stress is minimum includes:

acquiring an included angle between the first major fracture direction and the branch deflection fracture initiation direction, wherein the branch deflection fracture initiation direction is a principal stress direction of the position where the principal stress is minimum, and acquiring a normal stress of the branch deflection fracture of the first major fracture through the shear stress, the x-direction normal stress and the y-direction normal stress at the position where the principal stress is minimum and the included angle between the first major fracture direction and the branch deflection fracture initiation direction;

acquiring an increase value Δp of a net pressure in a fracture needed to generate a branch deflection fracture at the position where the principal stress is minimum through the normal stress of the branch deflection fracture and the minimum principal stress $\sigma_{min}$.

Preferably, injecting fracturing fluid into the first major fracture at a preset first injection speed until a deflection branch fracture is generated at the position where the principal stress of the first major fracture is minimum includes:

injecting fracturing fluid into the first major fracture at a preset first injection speed, and when a pressure $p_w$ at the bottom of the wellbore meets a preset pressure condition, continuing to inject a second preset amount of fracturing fluid into the first major fracture, and completing the generation of a deflection branch fracture at the position where the principal stress of the first major fracture is minimum.

According to a second aspect of the embodiment of the present disclosure, there is provided a multi-stage temporary plugging fracturing device based on a stress cage effect, including:

a pre-injecting module, which is configured to inject a preset amount of acid liquid into a wellbore at a preset injection speed to a stratum, so as to reduce a rock fracture pressure around the wellbore;

a major fracturing module, which is configured to inject a preset amount of fracturing fluid into the wellbore at a preset injection speed to the stratum, and form a first major fracture with an injection point in the stratum as a starting point;

a principal stress acquiring module, which is configured to acquire a position where a principal stress of the first major fracture is minimum, in which the magnitude of the principal stress at the position is denoted as $\sigma_{min}$;

an in-fracture net pressure acquiring module, which is configured to, according to the minimum principal stress $\sigma_{min}$, acquire an increase value Δp of a net pressure in a fracture needed to generate a branch deflection fracture at the position where the principal stress is minimum;

a temporary plugging deflection fluid consumption acquiring module, which is configured to, according to the increase value Δp of the net pressure in the fracture, acquire a volume of temporary plugging deflection fluid needed to generate the branch deflection fracture at the position where the principal stress is minimum;

a plugging module, which is configured to inject the acquired volume of temporary plugging deflection fluid into the first major fracture, and plug the position where the principal stress of the first major fracture is minimum;

a branch fracturing module, which is configured to inject fracturing fluid into the first major fracture at a preset first injection speed until a deflection branch fracture is generated at the position where the principal stress of the first major fracture is minimum;

a multistage temporary plugging deflection fracturing module, which is configured to repeat the above steps to form a plurality of deflection branch fractures in the first major fracture until the distance between the position where the principal stress of the first major fracture is minimum and the position of the injection point is less than a preset distance threshold, and complete multistage temporary plugging deflection fracturing of the first major fracture.

According to a third aspect of an embodiment of the present disclosure, there is provided a storage medium, wherein a computer program is stored in the storage medium, and the computer program, when being executed by a master controller, implements each step in the method described above.

The technical scheme provided by the embodiment of the present disclosure can include the following beneficial effects.

The present disclosure includes: determining a plugging point by acquiring a weak stress position on a major fracture; determining the consumption of temporary plugging deflection fluid by calculating a net pressure in a fracture that needs to be increased to generate a branch deflection fracture at the position where a principal stress is minimum; plugging a weakest stress position in the major fracture to form an artificial shielding layer, preventing subsequent fluid pressure from passing forward, thereby changing a geostress field near this position, thus forming an additional induced stress field near the weak position, generating a stress cage effect, and realizing multi-stage temporary plugging fracturing in vertical wells. The present disclosure overcomes the problem that it is difficult to form complex fractures by simply increasing liquid consumption and construction displacement to expand a liquid sweep range in a traditional manner.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

FIG. 1 is a schematic flow diagram of a multistage temporary plugging fracturing method based on a stress cage effect according to an exemplary embodiment.

In the figures: 1—pre-injecting module, 2—major fracturing module, 3—principal stress acquiring module, 4—in-fracture net pressure acquiring module, 5—temporary plugging deflection fluid consumption acquiring module, 6—plugging module, 7—branch fracturing module, and 8—multistage temporary plugging deflection fracturing module.

DETAILED DESCRIPTION OF THE EMBODIMENTS

Exemplary embodiments will be described in detail herein, examples of which are illustrated in the accompanying drawings. When the following description refers to the drawings, unless otherwise indicated, the same numbers in different drawings indicate the same or similar elements. The embodiments described in the following exemplary embodiments do not represent all embodiments consistent with the present disclosure. Rather, the embodiments are merely examples of devices and methods consistent with some aspects of the present disclosure as detailed in the appended claims.

Embodiment 1

FIG. 1 is a schematic flow diagram of a multistage temporary plugging fracturing method based on a stress cage effect according to an exemplary embodiment. As shown in FIG. 1, the method includes the following steps:

S1, injecting a preset amount of acid liquid into a wellbore at a preset injection speed to a stratum, so as to reduce a rock fracture pressure around the wellbore;

S2, injecting a preset amount of fracturing fluid into the wellbore at a preset injection speed to the stratum, and forming a first major fracture with an injection point in the stratum as a starting point;

S3, acquiring a position where a principal stress of the first major fracture is minimum, in which the magnitude of the principal stress at the position is denoted as $\sigma_{min}$;

S4, according to the minimum principal stress $\sigma_{min}$, acquiring an increase value $\Delta p$ of a net pressure in a fracture needed to generate a branch deflection fracture at the position where the principal stress is minimum;

S5, according to the increase value $\Delta p$ of the net pressure in the fracture, acquiring a volume of temporary plugging deflection fluid needed to generate the branch deflection fracture at the position where the principal stress is minimum;

S6, injecting the acquired volume of temporary plugging deflection fluid into the first major fracture, and plugging the position where the principal stress of the first major fracture is minimum;

S7, injecting fracturing fluid into the first major fracture at a preset first injection speed until a deflection branch fracture is generated at the position where the principal stress of the first major fracture is minimum;

S8, repeating Steps S2 to S6 to form a plurality of deflection branch fractures in the first major fracture until the distance between the position where the principal stress of the first major fracture is minimum and the position of the injection point is less than a preset distance threshold, and completing multistage temporary plugging deflection fracturing of the first major fracture.

Figure 2:
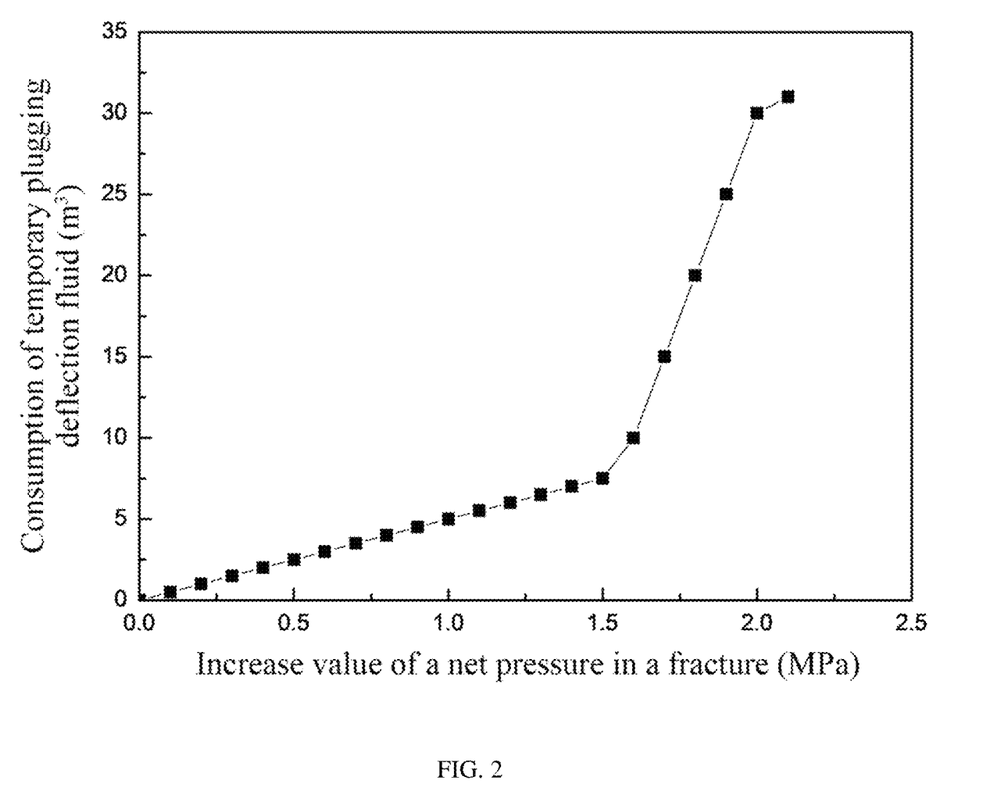
FIG. 2 is a schematic diagram of a relationship curve between an increase value of a net pressure and a consumption of temporary plugging deflection fluid according to another exemplary embodiment.

It can be understood that the present disclosure includes: injecting 100 to 500 m³ of fracturing fluid into the vertical wellbore of a tight reservoir to a stratum at the construction displacement of 5.0 to 10.0 m³/min; forming a first major fracture; acquiring a position where a principal stress of the first major fracture is minimum, in which the magnitude of the principal stress at the position is denoted as $\sigma_{min}$; according to the minimum principal stress $\sigma_{min}$, acquiring an increase value $\Delta p$ of a net pressure in a fracture that needs to be increased to generate a branch deflection fracture at the position where the principal stress is minimum; determining the volume of the temporary plugging deflection fluid corresponding to the increase value $\Delta p$ of the net pressure according to the relationship curve between the increase value $\Delta p$ of the net pressure and the consumption of temporary plugging deflection fluid acquired through experiments, in which the relationship curve between the increase value of the net pressure and the consumption of temporary plugging deflection fluid is shown in FIG. 2; injecting the acquired volume of temporary plugging deflection fluid into the stratum at the construction displacement of 1.0 to 5.0 m³/min, so as to plug the position where the principal stress of the first major fracture is minimum and form an artificial shielding layer; preventing subsequent fluid pressure from passing forward, thereby changing a geostress field near this position, thus forming an additional induced stress field near the weak position; generating a stress cage effect; and injecting fracturing fluid into the first major fracture at a preset first injection speed until a deflection branch fracture is generated at the position where the principal stress of the first major fracture is minimum. It is worth emphasizing that the position where the principal stress of the first major fracture is minimum will change with the occurrence of the branch fracture, and will gradually approach the starting point, that is, the injection point, from the end of the first major fracture. When the distance between the position where the principal stress of the first major fracture is minimum and the position of the injection point is less than a preset distance threshold, multistage temporary plugging deflection fracturing of the first major fracture is completed. The present disclosure includes: determining a plugging point by acquiring a weak stress position on a major fracture; determining the consumption of temporary plugging deflection fluid by calculating a net pressure in a fracture that needs to be increased to generate a branch deflection fracture at the position where a principal stress is minimum; plugging a weakest stress position in the major fracture to form an artificial shielding layer, preventing subsequent fluid pressure from passing forward, thereby changing a geostress field near this position, thus forming an additional induced stress field near the weak position, generating a stress cage effect, and realizing multi-stage temporary plugging fracturing in vertical wells. The present disclosure overcomes the problem that it is difficult to form complex fractures by simply increasing liquid consumption and construction displacement to expand a liquid sweep range in a traditional manner.

Preferably, the method further includes:
after completing multistage temporary plugging deflection fracturing of the first major fracture, injecting temporary plugging deflection fluid between the position where the principal stress of the first major fracture is minimum and the position of the injection point;
injecting the preset amount of fracturing fluid into the injection point at the preset injection speed, so that a second major fracture with a different direction from the first major fracture is generated with the injection point as the starting point;
thereafter, completing multistage temporary plugging deflection fracturing of the second major fracture according to the above steps;
generating a plurality of major fractures and completing multi-stage temporary plugging deflection fracturing of a plurality of major fractures until an angle between two adjacent major fractures is less than a preset angle threshold.

It can be understood that, after multistage temporary plugging deflection fracturing of the first major fracture is completed, temporary plugging deflection fluid is injected between the position where the principal stress of the first major fracture is minimum and the position of the injection point, so as to prevent the subsequent injection of fracturing fluid from continuously generating branch fractures on the first major fracture and prepare for the subsequent generation of new major fractures. Thereafter, 100 to 500 m³ of fracturing fluid is injected into the injection point at the bottom of the vertical wellbore of the tight reservoir at the construction displacement of 5.0 to 10.0 m³/min. A second major fracture with a different direction from the first major fracture is generated with the injection point as the starting point. Thereafter, repeat the above steps until the multi-stage temporary plugging deflection fracturing of the second major fracture is completed, and continue to generate new major fractures and complete multi-stage temporary plugging deflection fracturing. Finally, major fractures and branch fractures that spread around with the injection point as the center point are formed, and a fracture network is generated until the angle between two adjacent major fractures is less than the preset angle threshold, so as to prevent the branch fractures of two major fractures that are too close to each other and the branch fractures that are close to the injection point from penetrating each other.

Preferably, the method further includes:
after completing multistage temporary plugging of the first major fracture or a plurality of major fractures, injecting sand-carrying fluid into the stratum through the wellbore to support the formed multistage temporary plugging branch fracture;
thereafter, injecting displacement fluid with a wellbore volume into the stratum through the wellbore, and displacing the sand-carrying fluid in the wellbore into the stratum.

It can be understood that 1000 to 3000 m³ of sand-carrying fluid is injected into the stratum with a sand concentration of 5% to 30%, and the construction displacement is 5 to 10 m³/min, so as to effectively support the formed multi-stage temporary plugging deflection fracture and form a fracture network system with high flow conductivity. Thereafter, displacement fluid with a wellbore volume is injected into the stratum with the construction displacement of 1 to 3 m³/min, and the sand-carrying fluid in the wellbore is displaced into the stratum.

Preferably,
acquiring a position where a principal stress of the first major fracture is minimum includes:
acquiring a shear stress, an x-direction normal stress and a y-direction normal stress at different positions in the first major fracture, acquiring principal stresses at different positions through the shear stress, the x-direction normal stress and the y-direction normal stress at different positions, and comparing the principal stresses at different positions to acquire the position where the principal stress is minimum.

It can be understood that the shear stress, the x-direction normal stress and the y-direction normal stress at each position in the first major fracture are different. By acquiring the shear stress, the x-direction normal stress and the y-direction normal stress at different positions, the specific formula is as follows:

$$\sigma_r = \frac{\sigma_H + \sigma_h}{2}\left(1 - \frac{r_w^2}{r^2}\right) + \frac{\sigma_H - \sigma_h}{2}\left(1 + 3\frac{r_w^4}{r^4} - 4\frac{r_w^2}{r^2}\right)\cos 2\theta + p_w \frac{r_w^2}{r^2}$$

$$\sigma_\theta = \frac{\sigma_H + \sigma_h}{2}\left(1 + \frac{r_w^2}{r^2}\right) - \frac{\sigma_H - \sigma_h}{2}\left(1 + 3\frac{r_w^4}{r^4}\right)\cos 2\theta - p_w \frac{r_w^2}{r^2}$$

$$\sigma_{r\theta} = -\frac{\sigma_H - \sigma_h}{2}\left(1 - 3\frac{r_w^4}{r^4} + 2\frac{r_w^2}{r^2}\right)\sin 2\theta$$

The stress components $\sigma_r$, $\sigma_\theta$ and $\tau_{r\theta}$ in a cylindrical coordinate system in the above formula are converted into a rectangular coordinate system, respectively, thus obtaining $\sigma_x$, $\sigma_y$ and $\tau_{xy}$, where $$r = \sqrt{x^2 + y^2}, \tan\theta = \frac{y}{x},$$

(y, x) is a coordinate of a position in the first major fracture in the rectangular coordinate system, $r_w$ is a wellbore radius, $p_w$ is a bottom hole pressure, in which the following embodiments are used for the specific calculation formula, $\sigma_h$ is an original minimum horizontal principal stress of the stratum, which is a constant value, and $\sigma_H$ is the original maximum horizontal principal stress of the stratum, which is a constant value.

After acquiring the shear stress, the x-direction normal stress and the y-direction normal stress at different positions, the principal stress at different positions is acquired through the principal stress calculation formula. The principal stress calculation formula is as follows:

$$\sigma_p = \frac{1}{2}(\sigma_x - \sigma_y) + \sqrt{\tau_{xy}^2 + \frac{1}{4}(\sigma_x - \sigma_y)^2}$$

where $\tau_{xy}$ denotes a shear stress, $\sigma_x$ denotes the x-direction normal stress, $\sigma_y$ denotes the y-direction normal stress, and $\sigma_p$ denotes the maximum principal stress. Through the principal stress at different positions, the position where the principal stress of the first major fracture is minimum is acquired. The principal stress at the position where the principal stress is minimum is $\sigma_{min}$.

Preferably,
according to the minimum principal stress $\sigma_{min}$, acquiring an increase value $\Delta p$ of a net pressure in a fracture needed to generate a branch deflection fracture at the position where the principal stress is minimum includes:
acquiring an included angle between the first major fracture direction and the branch deflection fracture initiation direction, wherein the branch deflection fracture initiation direction is a principal stress direction of the position where the principal stress is minimum, and acquiring a normal stress of the branch deflection fracture of the first major fracture through the shear stress, the x-direction normal stress and the y-direction normal stress at the position where the principal stress is minimum and the included angle between the first major fracture direction and the branch deflection fracture initiation direction;
acquiring an increase value $\Delta p$ of a net pressure in a fracture needed to generate a branch deflection fracture at the position where the principal stress is minimum through the normal stress of the branch deflection fracture and the minimum principal stress $\sigma_{min}$.

It can be understood that after acquiring the principal stress $\sigma_{min}$ at the position where the principal stress of the first major fracture is minimum, the included angle between the first major fracture direction and the branch deflection fracture initiation direction is acquired. The branch deflection fracture initiation direction is the principal stress direction at the position where the principal stress is minimum. The calculation formula of the principal stress direction at the position where the principal stress is minimum is:

$$\tan(2\theta) = \frac{2\tau_{xy}}{\sigma_x - \sigma_y}$$

The normal stress of the branch deflection fracture of the first major fracture is acquired through the shear stress, the x-direction normal stress and the y-direction normal stress at the position where the principal stress is minimum and the included angle between the first major fracture direction and the branch deflection fracture initiation direction. The calculation formula of the normal stress of the branch deflection fracture is as follows:

$$\sigma_n = \frac{1}{2}(\sigma_x + \sigma_y) + \frac{1}{2}(\sigma_x - \sigma_y)\cos 2\theta + \tau_{xy}\sin 2\theta$$

where $\sigma_n$ denotes the normal stress of the branch deflection fracture, and $\theta$ is the included angle between the first major fracture direction and the branch deflection fracture initiation direction. After acquiring the normal stress and the minimum principal stress $\sigma_{min}$ at the position where the principal stress of the first major fracture is minimum, an increase value $\Delta p$ of a net pressure in a fracture is acquired through the calculation formula of the increase value $\Delta p$ of the net pressure in the fracture. The calculation formula of the increase value $\Delta p$ of the net pressure in the fracture is as follows:

$$\Delta p = \sigma_n - \sigma_{min}$$

Preferably,
injecting fracturing fluid into the first major fracture at a preset first injection speed until a deflection branch fracture is generated at the position where the principal stress of the first major fracture is minimum includes:
injecting fracturing fluid into the first major fracture at a preset first injection speed, and when a pressure $p_w$ at the bottom of the wellbore meets a preset pressure condition, continuing to inject a second preset amount of fracturing fluid into the first major fracture, and completing the generation of a deflection branch fracture at the position where the principal stress of the first major fracture is minimum.

It can be understood that the acquired volume of temporary plugging deflection fluid is injected into the stratum at the construction displacement of 1.0 to 5.0 m³/min, so as to plug the position where the principal stress of the first major fracture is the weakest and form an artificial shielding layer; subsequent fluid pressure is prevented from passing forward, thereby changing a geostress field near this position, thus forming an additional induced stress field near the weak position. A stress cage effect is generated. A certain amount of fracturing fluid is injected into the first major fracture at the construction displacement of 5.0 to 10.0 m³/min. A deflection branch fracture is generated at the position where the principal stress of the first major fracture is minimum. When a pressure $p_w$ at the bottom of the wellbore meets a preset pressure condition, it means that the branch deflection fracture is generated at this time, and 100 to 500 m³ of fracturing fluid is continuously injected to ensure that the branch deflection fracture continues to extend forward for a certain distance. The pressure $p_w$ meets the preset pressure condition as follows:

$$p_w = \left\{ \frac{k^c}{\sqrt{\pi \Delta L}} - \sigma_h F_\lambda(s) - p_f \left[1 + (1-s)\left(-0.137 + 0.258(1-s)^2 - 0.4s^2(1-s)\right)\right] \right\} / \left\{(1-s)\left[0.637 + 0.485(1-s)^2 + 0.4s^2(1-s)\right]\right\}$$

where $$\lambda = \frac{\sigma_H}{\sigma_h}$$

$$s = \Delta \frac{L}{(r_w + \Delta L)}$$

$$\omega = \frac{p_f}{|\sigma_h|}$$

$$F_\lambda(s) = (1-\lambda)F_0(s) + \lambda F_1(s)$$

$$F_0(s) = \frac{1}{2}(3-s)\left[1 + 1.243(1-s)^3\right]$$

$$F_1(s) = 1 + (1-s)\left[0.5 + 0.743(1-s)^2\right]$$

where $p_f$ is the pressure in the fracture in the first major fracture; $\Delta L$ is the length from the position where the stress of the first major fracture is minimum to the end of the first major fracture; $\sigma_H$ is the original maximum horizontal principal stress of the stratum, which is a constant value; $\sigma_h$ is the original minimum horizontal principal stress of the stratum, which is a constant value; $\pi$ is pi; $r_w$ is a wellbore radius; $k^c$ is fracture toughness.

It is worth emphasizing that in the formation of the branch fracture of the first major fracture, the pressure $p_w$ at the bottom of the wellbore meets the above conditions, while in the subsequent formation of the branch fracture of the major fracture, the pressure $p_w$ at the bottom of the wellbore meets the conditions different from those in the formation of the branch fracture of the first major fracture, as shown below:

$$p_{w2} = 2|\sigma_h| - \left(\frac{\nu}{1-\nu} + \frac{1-2\nu}{1-\nu}c_o\right)\Delta p_1 + \frac{E}{1-2\nu}(\alpha T_w + S_{swell}) + \sigma_t$$

where $$\Delta p_1 = p_{f1} - p_o$$

$$p_{f1} = 0.87 \frac{k_p^c}{2}\sqrt{\frac{\pi}{0.5h}} + \sigma_h$$

$$k_p^c = \frac{k^c}{2} + \sqrt{\left(\frac{k^c}{2}\right)^2 + \frac{Ew_c|\sigma_h|}{1-v^2}}$$

$$w_c = \frac{4(1-v^2)}{E}\Delta L(\sigma_h - p_f)$$

$$\Delta L = \frac{w_c E}{4(1-v^2)(\sigma_h - p_f)}$$

where $w_c$ is the width of the major fracture; $k_p^c$ is apparent fracture toughness of the major fracture; E is an elastic modulus of a rock; v is a Poisson's ratio; $\sigma_h$ is an original minimum horizontal principal stress of the stratum, which is a constant value; $\pi$ is pi; $p_{fl}$ is an in-fracture pressure of the major fracture; h is the height of the major fracture; $k^c$ is fracture toughness; $c_o$ is a ratio of the bulk modulus of a rock skeleton to a saturated fluid rock; $S_{swell}$ is a swelling stress resulted from water absorption of the wellbore wall rock; $\alpha$ is a coefficient of thermal expansion; $T_w$ is a temperature difference resulted from water absorption on the wellbore wall; $\sigma_t$ is a tensile strength of the rock; $\Delta p_1$ is a pressure difference between the flowing pressure in the major fracture and the pore pressure of the stratum; and $p_o$ is the pore pressure of the stratum.

In order to facilitate the understanding of the present disclosure, this embodiment also discloses a specific calculation example to verify the above scheme, which is as follows.

A vertical well in X tight oil block of Well A has undeveloped natural fractures. The thickness of sandstone drilled in the whole well is 20.8 m, the effective thickness is 14.2 m, the GR difference of a reservoir interlayer is 40 to 50 API, and the lithology has a strong barrier. The target interval of fracturing construction is 1748.0 to 1745.0 m. The geothermal gradient in this area is 5.15° C./100 m, which is a relatively high geothermal gradient reservoir. The pressure coefficient is 1.13 to 1.281 MPa/100 m, the original stratum pressure is 18.18 MPa, and the surface crude oil viscosity of the block is 38.9 mPa·s. In order to increase the oil production of the well, the multi-stage temporary plugging deflection fracturing construction based on the stress cage effect are carried out for the well. The specific pumping construction procedures are as follows.

200 m³ of fracturing fluid is injected into the vertical wellbore of the tight reservoir at the construction displacement of 5.0 m³/min to form the first major fracture.

Parameters such as the horizontal two-way geostress of 31.5 MPa/30.5 MPa, the vertical geostress of 76.3 MPa, the elastic modulus of 25.7 GPa, the Poisson's ratio of 0.25, the liquid injection volume of 200 m³, and the construction displacement of 5.0 m³/min are input. The stress components at each position after completing the first major fracture are $\sigma_x$, $\sigma_y$, $\tau_{xy}$, so as to find out the position where the maximum principal stress is the weakest, where the geostress is denoted as $\sigma_{min}$=34.6 MPa.

According to the formula $$\sigma_n = \frac{1}{2}(\sigma_x + \sigma_y) + \frac{1}{2}(\sigma_x - \sigma_y)\cos 2\theta + \tau_{xy}\sin 2\theta,$$

the normal stress is 36.5 MPa.

The increase value $\Delta p$ of the net pressure in the fracture that needs to be increased to inject temporary plugging deflection fluid is determined, and the calculation formula is as follows:

$$\Delta p = \sigma_n - \sigma_{min} = 36.5 - 34.6 = 1.9 \text{ MPa}$$

According to the relationship curve between the increase value of the net pressure and the consumption of temporary plugging deflection fluid shown in FIG. 2, it is determined that when $\Delta p$ is 1.9 MPa, the corresponding volume of temporary plugging deflection fluid is 25 m³.

25 m³ of temporary plugging deflection fluid is injected into the stratum at the construction displacement of 1.5 m³/min, so as to plug the position where the principal stress of the first major fracture is the weakest and form an artificial shielding layer. Subsequent fluid pressure is prevented from passing forward, thereby changing a geostress field near this position, thus forming an additional induced stress field near the weak position. A stress cage effect is generated.

A certain amount of fracturing fluid is injected into the first major fracture at the construction displacement of 5.0 m³/min. A deflection branch fracture is generated at the position where the principal stress is minimum. When a pressure $p_w$ at the bottom of the wellbore is greater than 69.8 MPa, it means that the branch deflection fracture is generated at this time, and 200 m³ of fracturing fluid is continuously injected to ensure that the branch deflection fracture continues to extend forward for a certain distance.

Repeat Steps 2 to 7 for 5 times, forming 6 branch deflection fractures in the first major fracture, that is, six-stage in-fracture temporary plugging deflection fracturing construction is implemented in total.

Temporary plugging deflection fluid is injected between the position where the principal stress of the first major fracture is minimum and the position of the injection point to avoid forming new branch fractures on the first major fracture. Thereafter, 200 m³ of fracturing fluid is injected into the vertical wellbore of the tight reservoir to the stratum at the injection point with a construction displacement of 5.0 m³/min, so as to form the second major fracture.

$\sigma_{min2}$=38.8 MPa of the second major fracture is calculated.

The normal stress $\sigma_{n2}$ at the position where the principal stress of the second major fracture is minimum is calculated:

$$\sigma_{n2} = \frac{1}{2}(\sigma_x + \sigma_y) + \frac{1}{2}(\sigma_x - \sigma_y)\cos 2\theta + \tau_{xy}\sin 2\theta = 40.8 \text{ MPa};$$

The increase value $\Delta p_2$ of the net pressure in the fracture that needs to be increased to inject the temporary plugging deflection fluid is determined:

$$\Delta p_2 = \sigma_{n2} - \sigma_{min2} = 40.8 - 38.8 = 2 \text{ MPa};$$

According to the relationship curve between the increase value of the net pressure and the consumption of temporary plugging deflection fluid shown in FIG. 2, it is determined that when $\Delta p_2$ is 2 MPa, the corresponding volume of temporary plugging deflection fluid is 30 m³.

30 m³ of temporary plugging deflection fluid is injected into the stratum at the construction displacement of 1.5 m³/min, so as to plug the seam at the wellbore at the position where the principal stress of the second major fracture is the weakest and form an artificial shielding layer. Subsequent fluid pressure is prevented from passing forward, thereby changing a geostress field near this position, thus forming an additional induced stress field near the weak position. A stress cage effect is generated near the wellbore.

A certain amount of fracturing fluid is injected into the second major fracture at the construction displacement of 5.0 m³/min. A seam deflection fracture is generated at the position where the principal stress of the second major fracture is the weakest. When a pressure $p_{w2}$ at the bottom of the wellbore is greater than 71.8 MPa, the calculation formula of $p_{w2}$ is:

$$p_{w2} = 2|\sigma_h| - \left(\frac{v}{1-v} + \frac{1-2v}{1-v}c_o\right)\Delta p_1 + \frac{E}{1-2v}(\alpha T_w + S_{swell}) + \sigma_t$$

It means that the seam deflection fracture is generated at this time, and 500 m³ of fracturing fluid is continuously injected to ensure that the seam deflection fracture continues to extend forward for a certain distance, thus completing the construction of temporary plugging deflection fracturing of the seam to form the first branch fracture of the second major fracture. Repeat the above steps until the formation of six branch fractures of the second major fracture is completed. Thereafter, a third major fracture is generated. Finally, six major fractures are formed around the wellbore, each of which includes six in-fracture branch deflection fractures.

1000 m³ of sand-carrying fluid is injected into the stratum with a sand concentration of 15%, and the construction displacement is 5 m³/min, so as to effectively support the formed multi-stage temporary plugging deflection fracture and form a fracture network system with high flow conductivity.

Displacement fluid with a wellbore volume is injected into the stratum with the construction displacement of 2 m³/min, and the sand-carrying fluid in the wellbore is displaced into the stratum.

Embodiment 2

Figure 3:
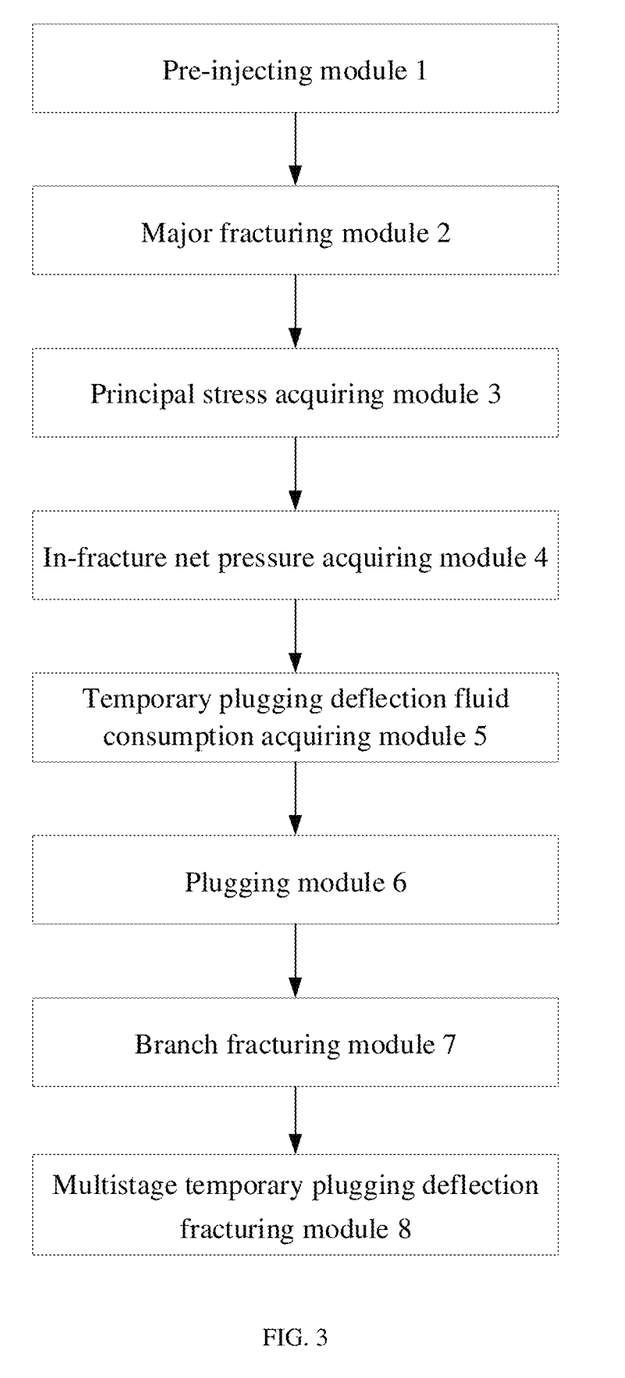
FIG. 3 is a system schematic diagram of a multistage temporary plugging fracturing device based on a stress cage effect according to an exemplary embodiment.

FIG. 3 is a system schematic diagram of a multistage temporary plugging fracturing device based on a stress cage effect according to an exemplary embodiment, including:
- a pre-injecting module 1, which is configured to inject a preset amount of acid liquid into a wellbore at a preset injection speed to a stratum, so as to reduce a rock fracture pressure around the wellbore;
- a major fracturing module 2, which is configured to inject a preset amount of fracturing fluid into the wellbore at a preset injection speed to the stratum, and form a first major fracture with an injection point in the stratum as a starting point;
- a principal stress acquiring module 3, which is configured to acquire a position where a principal stress of the first major fracture is minimum, in which the magnitude of the principal stress at the position is denoted as $\sigma_{min}$;
- an in-fracture net pressure acquiring module 4, which is configured to, according to the minimum principal stress $\sigma_{min}$, acquire an increase value $\Delta p$ of a net pressure in a fracture needed to generate a branch deflection fracture at the position where the principal stress is minimum;
- a temporary plugging deflection fluid consumption acquiring module 5, which is configured to, according to the increase value $\Delta p$ of the net pressure in the fracture, acquire a volume of temporary plugging deflection fluid needed to generate the branch deflection fracture at the position where the principal stress is minimum;
- a plugging module 6, which is configured to inject the acquired volume of temporary plugging deflection fluid into the first major fracture, and plug the position where the principal stress of the first major fracture is minimum;
- a branch fracturing module 7, which is configured to inject fracturing fluid into the first major fracture at a preset first injection speed until a deflection branch fracture is generated at the position where the principal stress of the first major fracture is minimum;
- a multistage temporary plugging deflection fracturing module 8, which is configured to repeat the above steps to form a plurality of deflection branch fractures in the first major fracture until the distance between the position where the principal stress of the first major fracture is minimum and the position of the injection point is less than a preset distance threshold, and complete multistage temporary plugging deflection fracturing of the first major fracture.

It can be understood that the pre-injecting module 1 is configured to inject a preset amount of acid liquid into a wellbore at a preset injection speed to a stratum, so as to reduce a rock fracture pressure around the wellbore; the major fracturing module 2 is configured to inject a preset amount of fracturing fluid into the wellbore at a preset injection speed to the stratum, and form a first major fracture with an injection point in the stratum as a starting point; the principal stress acquiring module 3 is configured to acquire a position where a principal stress of the first major fracture is minimum, in which the magnitude of the principal stress at the position is denoted as $\sigma_{min}$; the in-fracture net pressure acquiring module 4 is configured to, according to the minimum principal stress $\sigma_{min}$, acquire an increase value $\Delta p$ of a net pressure in a fracture needed to generate a branch deflection fracture at the position where the principal stress is minimum; the temporary plugging deflection fluid consumption acquiring module 5 is configured to, according to the increase value $\Delta p$ of the net pressure in the fracture, acquire a volume of temporary plugging deflection fluid needed to generate the branch deflection fracture at the position where the principal stress is minimum; the plugging module 6 is configured to inject the acquired volume of temporary plugging deflection fluid into the first major fracture, and plug the position where the principal stress of the first major fracture is minimum; the branch fracturing module 7 is configured to inject fracturing fluid into the first major fracture at a preset first injection speed until a deflection branch fracture is generated at the position where the principal stress of the first major fracture is minimum; the multistage temporary plugging deflection fracturing module 8 is configured to repeat the above steps to form a plurality of deflection branch fractures in the first major fracture until the distance between the position where the principal stress of the first major fracture is minimum and the position of the injection point is less than a preset distance threshold, and complete multistage temporary plugging deflection fracturing of the first major fracture. The present disclosure includes: determining a plugging point by acquiring a weak stress position on a major fracture; determining the consumption of temporary plugging deflection fluid by calculating a net pressure in a fracture that needs to be increased to generate a branch deflection fracture at the position where a principal stress is minimum; plugging a weakest stress position in the major fracture to form an artificial shielding layer, preventing subsequent fluid pressure from passing forward, thereby changing a geostress field near this position, thus forming an additional induced stress field near the weak position, generating a stress cage effect, and realizing multi-stage temporary plugging fracturing in vertical wells. The present disclosure overcomes the problem that it is difficult to form complex fractures by simply increasing liquid consumption and construction displacement to expand a liquid sweep range in a traditional manner.

Embodiment 3

This embodiment provides a storage medium, wherein a computer program is stored in the storage medium, and the computer program, when being executed by a master controller, implements each step in the method described above.

It can be understood that the storage medium mentioned above can be a read-only memory, a magnetic disk or an optical disk, etc.

It can be understood that the same or similar parts in the above-mentioned embodiments can refer to each other, and what is not explained in detail in some embodiments can refer to the same or similar parts in other embodiments.

It should be noted that in the description of the present disclosure, the terms "first" and "second" are only used for the purpose of description and cannot be understood as indicating or implying relative importance. In addition, in the description of the present disclosure, unless otherwise specified, "a plurality of" means at least two.

Any process or method description in the flowchart or otherwise described herein can be understood as representing a module, segment or part of the code that includes one or more executable instructions for implementing steps of specific logical functions or the process, and the scope of preferred embodiments of the present disclosure includes other implementations, in which functions can be performed out of the order shown or discussed, including in a substantially simultaneous manner or in the reverse order according to the functions involved, which should be understood by those skilled in the art to which embodiments of the present disclosure belong.

It should be understood that various parts of the present disclosure can be implemented in hardware, software, firmware or a combination thereof. In the above embodiments, a plurality of steps or methods can be implemented by software or firmware stored in a memory and executed by an appropriate instruction execution system. For example, if the steps or methods are implemented in hardware, as in another embodiment, the steps or methods can be implemented by any one of the following technologies known in the art or the combination thereof: a discrete logic circuit with a logic gate circuit for implementing a logic function on a data signal, an application specific integrated circuit with a suitable combinational logic gate circuit, a Programmable Gate Array (PGA), a Field Programmable Gate Array (FPGA), and the like.

Those skilled in the art can understand that all or part of the steps carried by the above embodiment method can be completed by instructing related hardware through a program, which can be stored in a computer-readable storage medium. The program, when executed, includes one of the steps of the method embodiment or the combination thereof.

In addition, each functional unit in each embodiment of the present disclosure may be integrated in one processing module, or each unit may exist physically alone, or two or more units may be integrated in one module. The above integrated module can be realized in the form of hardware or software functional modules. The integrated module can also be stored in a computer-readable storage medium if it is implemented in the form of a software functional module and sold or used as an independent product.

The storage medium mentioned above can be a read-only memory, a magnetic disk or an optical disk, etc.

In the description of this specification, descriptions referring to the terms "one embodiment", "some embodiments", "examples", "specific examples" or "some examples" mean that specific features, structures, materials or characteristics described in connection with this embodiment or example are included in at least one embodiment or example of the present disclosure. In this specification, the schematic expressions of the above terms do not necessarily refer to the same embodiment or example. Moreover, the specific features, structures, materials or characteristics described may be combined in any one or more embodiments or examples in a suitable manner.

Although the embodiments of the present disclosure have been shown and described above, it can be understood that the above embodiments are exemplary and cannot be understood as limitations of the present disclosure. Those skilled in the art can make changes, modifications, substitutions and variations to the above embodiments within the scope of the present disclosure.

What is claimed is:

1. A multi-stage temporary plugging fracturing method based on a stress cage effect, comprising:
    injecting a preset amount of acid liquid into a wellbore at a preset injection speed to a stratum, so as to reduce a rock fracture pressure around the wellbore;
    injecting a preset amount of fracturing fluid into the wellbore at a preset injection speed to the stratum, and forming a first major fracture with an injection point in the stratum as a starting point;
    acquiring a position where a principal stress of the first major fracture is minimum, in which the magnitude of the principal stress at the position is denoted as $\sigma_{min}$;
    according to the minimum principal stress $\sigma_{min}$, acquiring an increase value $\Delta p$ of a net pressure in a fracture needed to generate a branch deflection fracture at the position where the principal stress is minimum;
    according to the increase value $\Delta p$ of the net pressure in the fracture, acquiring a volume of temporary plugging deflection fluid needed to generate the branch deflection fracture at the position where the principal stress is minimum;
    injecting the acquired volume of temporary plugging deflection fluid into the first major fracture, and plugging the position where the principal stress of the first major fracture is minimum;
    injecting fracturing fluid into the first major fracture at a preset first injection speed until a deflection branch fracture is generated at the position where the principal stress of the first major fracture is minimum;
    repeating the above steps to form a plurality of deflection branch fractures in the first major fracture until the distance between the position where the principal stress of the first major fracture is minimum and the position of the injection point is less than a preset distance threshold, and completing multistage temporary plugging deflection fracturing of the first major fracture.

2. The method according to claim 1, further comprising:
    after completing multistage temporary plugging deflection fracturing of the first major fracture, injecting temporary plugging deflection fluid between the position where the principal stress of the first major fracture is minimum and the position of the injection point;

injecting the preset amount of fracturing fluid into the injection point at the preset injection speed, so that a second major fracture with a different direction from the first major fracture is generated with the injection point as the starting point;

thereafter, completing multistage temporary plugging deflection fracturing of the second major fracture according to the above steps;

generating a plurality of major fractures and completing multi-stage temporary plugging deflection fracturing of a plurality of major fractures until an angle between two adjacent major fractures is less than a preset angle threshold.

3. The method according to claim 1, further comprising:

after completing multistage temporary plugging of the first major fracture or a plurality of major fractures, injecting sand-carrying fluid into the stratum through the wellbore to support the formed multistage temporary plugging branch fracture;

thereafter, injecting displacement fluid with a wellbore volume into the stratum through the wellbore, and displacing the sand-carrying fluid in the wellbore into the stratum.

4. The method according to claim 1, wherein acquiring a position where a principal stress of the first major fracture is minimum comprises:

acquiring a shear stress, an x-direction normal stress and a y-direction normal stress at different positions in the first major fracture, acquiring principal stresses at different positions through the shear stress, the x-direction normal stress and the y-direction normal stress at different positions, and comparing the principal stresses at different positions to acquire the position where the principal stress is minimum.

5. The method according to claim 4, wherein according to the minimum principal stress $\sigma_{min}$, acquiring an increase value $\Delta p$ of a net pressure in a fracture needed to generate a branch deflection fracture at the position where the principal stress is minimum comprises:

acquiring an included angle between the first major fracture direction and the branch deflection fracture initiation direction, wherein the branch deflection fracture initiation direction is a principal stress direction of the position where the principal stress is minimum, and acquiring a normal stress of the branch deflection fracture of the first major fracture through the shear stress, the x-direction normal stress and the y-direction normal stress at the position where the principal stress is minimum and the included angle between the first major fracture direction and the branch deflection fracture initiation direction;

acquiring an increase value $\Delta p$ of a net pressure in a fracture needed to generate a branch deflection fracture at the position where the principal stress is minimum through the normal stress of the branch deflection fracture and the minimum principal stress $\sigma_{min}$.

6. The method according to claim 5, wherein injecting fracturing fluid into the first major fracture at a preset first injection speed until a deflection branch fracture is generated at the position where the principal stress of the first major fracture is minimum comprises:

injecting fracturing fluid into the first major fracture at a preset first injection speed, and when a pressure $p_w$ at the bottom of the wellbore meets a preset pressure condition, continuing to inject a second preset amount of fracturing fluid into the first major fracture, and completing the generation of a deflection branch fracture at the position where the principal stress of the first major fracture is minimum.

7. A storage medium, wherein a computer program is stored in the storage medium, and the computer program, when being executed by a master controller, implements each step in the multi-stage temporary plugging fracturing method based on the stress cage effect according to claim 1.

8. A multi-stage temporary plugging fracturing device based on a stress cage effect, comprising:

a computer-readable storage medium;

a pre-injecting module, which is configured to inject a preset amount of acid liquid into a wellbore at a preset injection speed to a stratum, so as to reduce a rock fracture pressure around the wellbore;

a major fracturing module, which is configured to inject a preset amount of fracturing fluid into the wellbore at a preset injection speed to the stratum, and form a first major fracture with an injection point in the stratum as a starting point;

a principal stress acquiring module, which is configured to acquire a position where a principal stress of the first major fracture is minimum, in which the magnitude of the principal stress at the position is denoted as $\sigma_{min}$;

an in-fracture net pressure acquiring module, which is configured to, according to the minimum principal stress $\sigma_{min}$, acquire an increase value $\Delta p$ of a net pressure in a fracture needed to generate a branch deflection fracture at the position where the principal stress is minimum;

a temporary plugging deflection fluid consumption acquiring module, which is configured to, according to the increase value $\Delta p$ of the net pressure in the fracture, acquire a volume of temporary plugging deflection fluid needed to generate the branch deflection fracture at the position where the principal stress is minimum;

a plugging module, which is configured to inject the acquired volume of temporary plugging deflection fluid into the first major fracture, and plug the position where the principal stress of the first major fracture is minimum;

a branch fracturing module, which is configured to inject fracturing fluid into the first major fracture at a preset first injection speed until a deflection branch fracture is generated at the position where the principal stress of the first major fracture is minimum;

a multistage temporary plugging deflection fracturing module, which is configured to repeat the above steps to form a plurality of deflection branch fractures in the first major fracture until the distance between the position where the principal stress of the first major fracture is minimum and the position of the injection point is less than a preset distance threshold, and complete multistage temporary plugging deflection fracturing of the first major fracture.

* * * * *